United States Patent
Nimmons et al.

(10) Patent No.: US 9,508,470 B2
(45) Date of Patent: Nov. 29, 2016

(54) VIBRATION DAMAGE REPAIR IN DYNAMOELECTRIC MACHINES

(71) Applicant: General Electric Company, Schenectady, NY (US)

(72) Inventors: Jessica Frances Nimmons, Clifton Park, NY (US); Daniel Lawrence Banowetz, Glenville, NY (US); Jessica Mary Powers, Colonie, NY (US); Dennis Anthony Pasquarella, Schenecatady, NY (US); Leonard Paul Squillacioti, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 409 days.

(21) Appl. No.: 14/065,953

(22) Filed: Oct. 29, 2013

(65) Prior Publication Data

US 2015/0115764 A1   Apr. 30, 2015

(51) Int. Cl.
*H02K 15/12* (2006.01)
*H01B 13/00* (2006.01)
*H02K 3/48* (2006.01)
*H02K 15/00* (2006.01)

(52) U.S. Cl.
CPC ............ *H01B 13/0026* (2013.01); *H02K 3/48* (2013.01); *H02K 15/0006* (2013.01); *H02K 15/12* (2013.01)

(58) Field of Classification Search
CPC ....................................................... H02K 3/48
USPC ................................................ 310/214–215
See application file for complete search history.

(56) References Cited

U.S. PATENT DOCUMENTS

| | | | |
|---|---|---|---|
| 3,158,770 A | * | 11/1964 | Coggeshall ............ H02K 3/48 174/42 |
| 3,824,683 A | | 7/1974 | Rhudy |
| 4,001,616 A | | 1/1977 | Lonseth et al. |
| 4,008,409 A | | 2/1977 | Rhudy et al. |
| 4,068,691 A | | 1/1978 | Lonseth et al. |
| 4,095,627 A | | 6/1978 | Lonseth et al. |
| 4,110,900 A | | 9/1978 | Lonseth et al. |
| 4,112,041 A | | 9/1978 | Lonseth et al. |

(Continued)

FOREIGN PATENT DOCUMENTS

| | | |
|---|---|---|
| CH | 658956 A5 | 12/1986 |
| CN | 101938176 A | 1/2011 |

(Continued)

OTHER PUBLICATIONS

European Search Report for Application No. 14190170.2; Reference No. 168917/20961; Applicant: General Electric Company; Dated Jul. 13, 2016; pp. 8.

*Primary Examiner* — Burton Mullins
(74) *Attorney, Agent, or Firm* — Ernest G. Cusick; Hoffman Warnick LLC

(57) ABSTRACT

Embodiments of the disclosure can include a method for reducing or repairing vibration-caused damage in a stator bar, and a dynamoelectric machine resulting therefrom. The method for reducing vibration-caused damage in a stator can include applying, from within a ventilation slot of a stator core, a liquid based vibration-absorbing material onto a side ripple spring, the side ripple spring being in contact with a stator bar and the stator core; and allowing the liquid based vibration-absorbing material to cure, wherein the cured vibration-absorbing material remains in contact with the side ripple spring for absorbing stator vibrations.

18 Claims, 10 Drawing Sheets

(56) References Cited

U.S. PATENT DOCUMENTS

| | | | |
|---|---|---|---|
| 4,369,389 A * | 1/1983 | Lambrecht | H02K 3/40 174/DIG. 19 |
| 4,584,497 A * | 4/1986 | Butman, Jr. | H02K 3/48 310/214 |
| 6,645,416 B2 | 11/2003 | Bock et al. | |
| 6,940,203 B2 | 9/2005 | Kogan et al. | |
| 7,711,983 B2 | 5/2010 | Hatasaki et al. | |
| 8,287,965 B2 * | 10/2012 | Aoki | H02K 3/40 118/317 |
| 2003/0001528 A1 | 1/2003 | Joo | |
| 2004/0119364 A1 * | 6/2004 | Thiot | H02K 9/22 310/215 |
| 2005/0088053 A1 | 4/2005 | Kogan et al. | |
| 2008/0313242 A1 | 12/2008 | Doerr | |
| 2009/0271658 A1 | 10/2009 | Aidun | |

FOREIGN PATENT DOCUMENTS

| | | | |
|---|---|---|---|
| EP | 0601827 A1 | 6/1994 | |
| EP | 2339723 A1 | 6/2011 | |
| EP | 2642645 A1 | 9/2013 | |
| JP | 2006-180611 | * 7/2006 | H02K 15/065 |

* cited by examiner

Fig. 6

VIBRATION DAMAGE REPAIR IN DYNAMOELECTRIC MACHINES

BACKGROUND OF THE INVENTION

The disclosure relates generally to dynamoelectric machines. More particularly, the present disclosure relates to a method for reducing or repairing vibration damage in a stator core, and a dynamoelectric machine resulting from the method.

Dynamoelectric machines, such as generators, may be used in power plants, cogeneration plants, vehicles, or other implementations for converting mechanical energy into electrical energy. Dynamoelectric machines may include several laminations stacked into a "stator core," and used to create magnetic conductance for power generation. A stator armature composed of one or more stator bars may be wound throughout the stator core. The stator core can include stator bar slots for holding stator bars and other components. In some cases, a side ripple spring can be coupled to the stator core or the stator bar. In situations where the stator bar does not completely fill a stator bar slot, the side ripple spring can flexibly occupy any remaining gaps between the stator bar and the stator core.

As a dynamoelectric machine operates, stator bars contained in a stator core can suffer damage from stator vibrations. A side ripple spring on the stator core or the stator bars can reduce this damage by absorbing the stator vibrations. However, side ripple springs themselves can also experience wear and degradation over time.

BRIEF DESCRIPTION OF THE INVENTION

A first aspect of the disclosure provides a method for reducing vibration damage in a stator, the method comprising: applying, from within a ventilation slot of a stator core, a liquid based vibration-absorbing material onto a side ripple spring, the side ripple spring being in contact with a stator bar and the stator core; and allowing the liquid based vibration-absorbing material to cure, wherein the cured vibration-absorbing material remains in contact with the side ripple spring to absorb stator vibrations.

A second aspect of the disclosure provides a method for repairing a side ripple spring comprising a fiberglass material, the method comprising: applying a liquid based vibration-absorbing material, including a silicone resin, onto the side ripple spring to impregnate the fiberglass material of the side ripple spring with the silicone resin of the liquid based vibration-absorbing material, wherein the applying occurs within a ventilation slot of a stator core; allowing the liquid based vibration-absorbing material to cure, wherein the cured vibration-absorbing material remains in contact with the side ripple spring for absorbing stator vibrations.

A third aspect of the invention provides a dynamoelectric machine comprising: a stator core having a stator bar slot, wherein the stator bar slot includes an end-iron region; a stator bar installed within the stator bar slot, wherein at least a portion of the stator bar slot is within the end-iron region; and a cured vibration-absorbing material, including a non-conductive room-temperature vulcanizing silicone, located within the end-iron region and in contact with each of the stator core and the stator bar.

BRIEF DESCRIPTION OF THE DRAWING

These and other features of the disclosed system will be more readily understood from the following detailed description of the various aspects of the system taken in conjunction with the accompanying drawings that depict various embodiments, in which:

FIG. 6 is a cross sectional view of a configuration for applying a liquid based vibration-absorbing material onto a side ripple spring according to an embodiment of the invention.

It is noted that the drawings are not necessarily to scale. The drawings are intended to depict only typical aspects of the disclosure, and therefore should not be considered as limiting its scope. In the drawings, like numbering represents like elements between the drawings.

DETAILED DESCRIPTION OF THE INVENTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

Spatially relative terms, such as "below," "lower," "above," "upper," "axial," "radial" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Generally, the present disclosure relates to methods for reducing vibration-caused damage in a stator core of a dynamoelectric machine. In some embodiments, the method can repair side ripple springs and end iron regions of a stator core.

Figure 1:
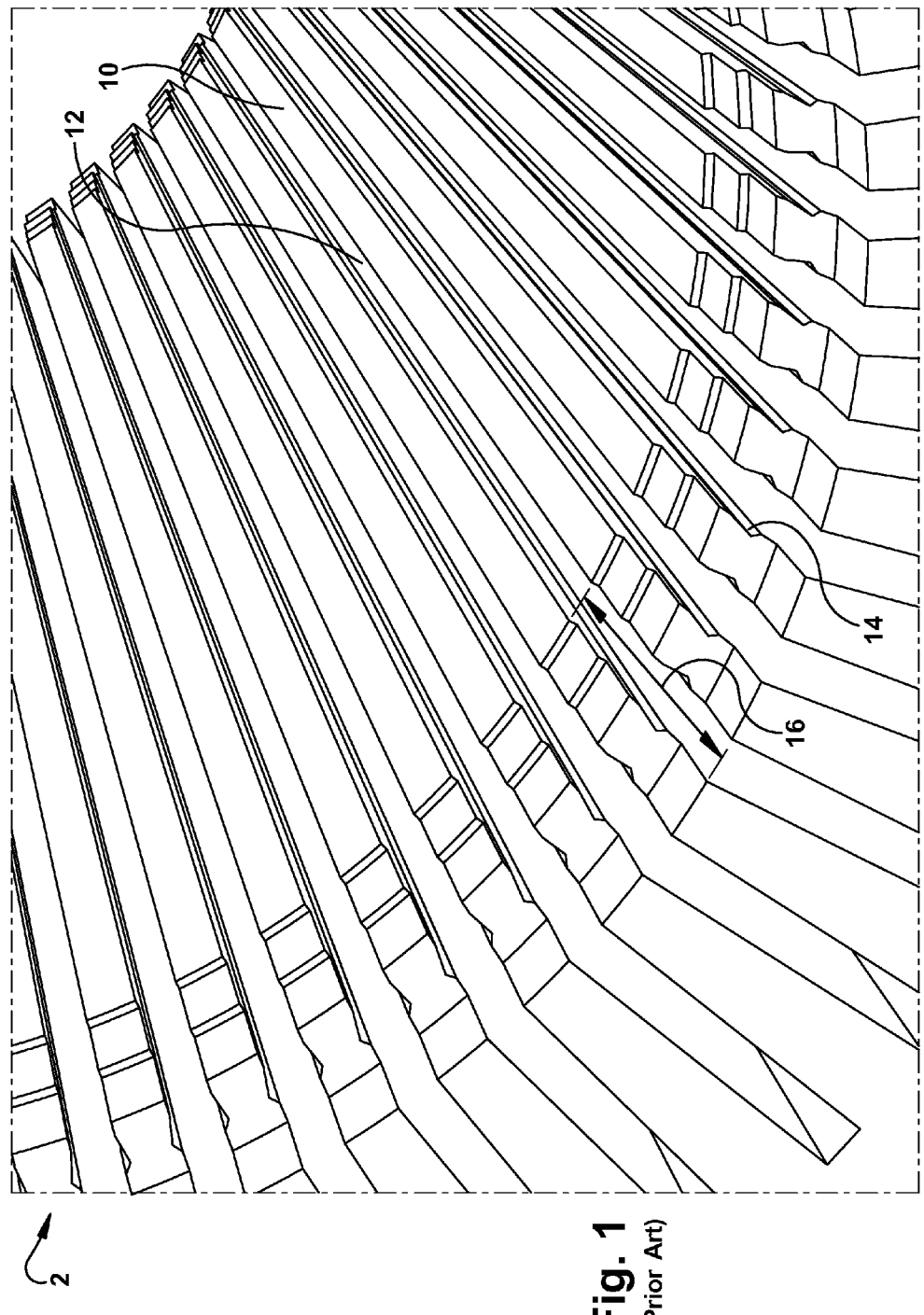
FIG. 1 is a perspective partial view of a conventional stator core.

Referring to the drawings, FIG. 1 depicts a dynamoelectric machine 2, in which a user can perform methods according to an embodiment of the invention. Dynamoelectric machine 2 can include a rotating component (not shown) inside of a stator core 10. Stator core 10 can be designed to have a substantially circular cross-sectional geometry with a hollow center. In addition, a plurality of circumferentially spaced stator bar slots 12 may be present along the interior of stator core 10. As discussed elsewhere herein, each stator bar slot 12 may be designed to contain one or more "stator bars," an assembly of which may be called a "stator armature." Portions of each stator bar slot 12 can include one or more dovetails 14. Dovetails 14 can engage portions of stator bars or stator armature by outwardly extending portions, such as wedges, as described elsewhere herein. The region of stator core 10 where the radially inner surface of stator core 10 tapers away from the core of dynamoelectric machine 2 may be referred to as an "end-iron region" 16. In end-iron region 16, dovetails 14 may vanish, as shown in FIG. 1, as the radially inner surface of stator core 10 steps down. In some contexts, end-iron region 16 can also be known as an "end stepping region."

Figure 2:
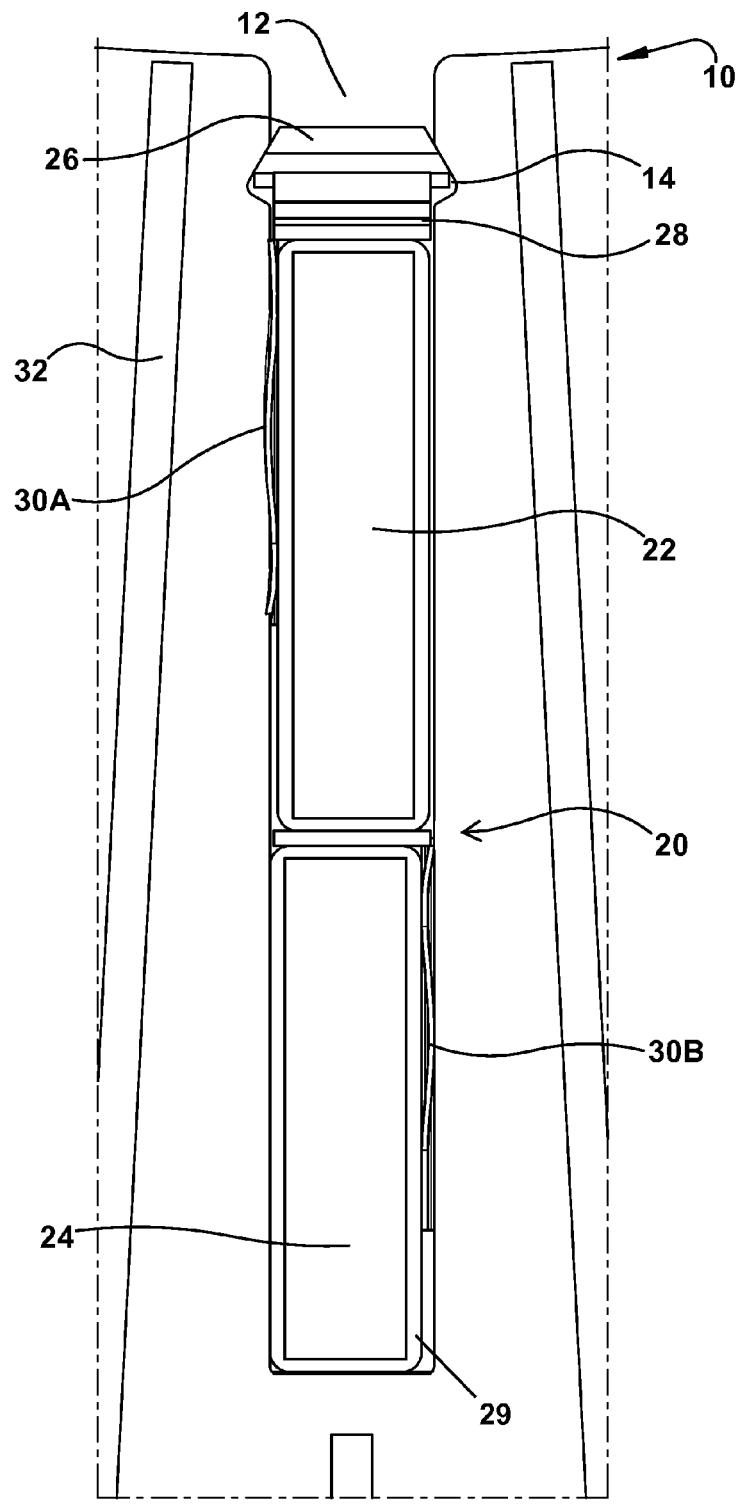
FIG. 2 is a cross sectional view of a conventional stator bar within a conventional stator bar slot.

Turning to FIG. 2, an example group of conventional components engaging the inside surface stator bar slot 12 is shown. One or more of stator bar slots 12 can include a stator armature 20 installed therein. Stator armature 20 may also be referred to as a "stator winding." Stator armature 20 can include a first stator bar 22 coupled to a second stator bar 24. In various embodiments, stator armature 20 may be composed of several discrete components, as shown by example in FIG. 2, or may be a single continuous piece. Stator armature 20 can be wound through several stator bar slots 12 within stator core 10. In addition, a radially inner side of stator armature 20 can be coupled to a wedge 26. Wedge 26 can engage dovetail 14 and be positioned therein, thereby reducing radial movement of stator armature 20.

A top ripple spring 28 can couple wedge 26 and stator armature 20 to each other. Top ripple spring 28 and wedge 26, together, can reduce movement of stator armature 20 in a radial direction relative to stator core 10. Top ripple spring 28 can also absorb some vibrations acting on stator armature 20. In addition, first stator bar 22 and/or second stator bar 24 of stator armature 20 can include one or more layers of armor 29. Armor 29 can electrically insulate and/or protect stator armature 20 from stator vibrations.

As dynamoelectric machine 2 (FIG. 1) operates, stator armature 20 can experience alternating electromagnetic loads and/or electrical discharges. These effects may cause stator core 10 to vibrate, and the resulting vibrations may spread throughout dynamoelectric machine 2. In some cases, stator vibrations can damage the various components installed within stator bar slot 12. Stator vibrations can also cause stator armature 20 and/or armor 29 to become loose and susceptible to further damage.

One or more side ripple springs 30A, 30B can be in contact with stator armature 20, and may be installed to absorb stator vibrations and reduce movement by stator armature 20 within the plane of stator bar slot 12. Side ripple springs 30A, 30B can be coupled to the side of a stator bar slot 12. First stator bar 22 and/or second stator bar 24 can contact side ripple springs 30A, 30B. Side ripple springs 30A, 30B can be made of fiberglass or similar flexible materials. Side ripple springs 30A, 30B being flexible, can accommodate stator bars 20 of different shapes and sizes. In addition, stator core 10 can include spacer blocks 32 to define ventilation slots in stator core 10 as described herein. Ventilation slots defined by spacer blocks 32 can allow hot air, generated during the operation of dynamoelectric machine 2 (FIG. 1), to escape stator bar slot 12 and thereby prevent stator armature 20 from overheating.

Figure 3:
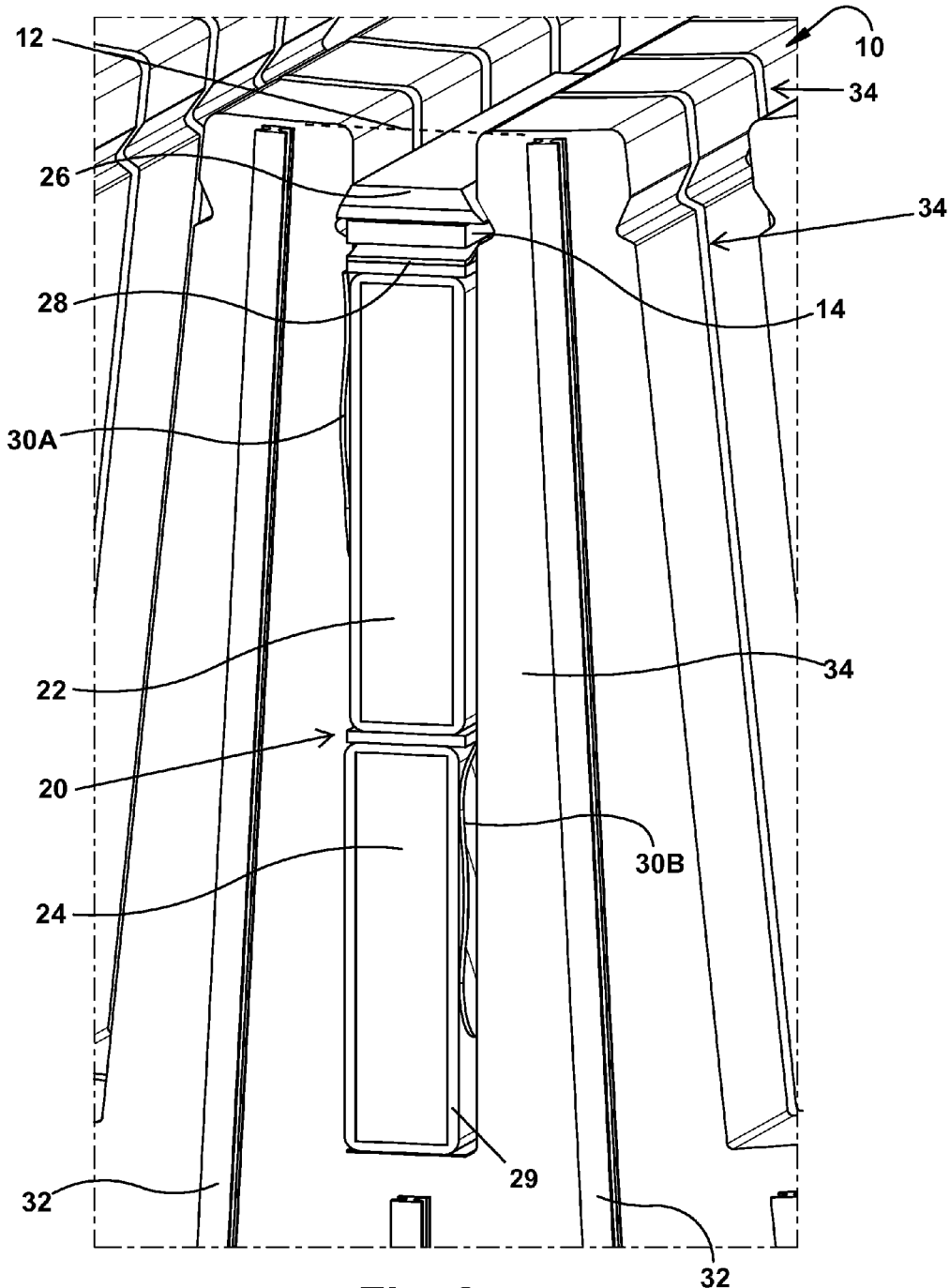
FIG. 3 is a perspective partial view of a conventional stator bar within a stator bar slot.

Turning to FIG. 3, a perspective view of slot 12 and stator armature 20 is shown. As described elsewhere herein, the shape of dynamoelectric machine 2 (FIG. 1) and/or stator core 10 can be substantially circular. One or more radially oriented ventilation slots 34 at various axial positions can extend circumferentially throughout stator core 10. As discussed elsewhere herein, ventilation slots 34 can allow hot air to escape stator core 10. Ventilation slots 34 can extend between each stator armature 20 and corresponding spacer blocks 32. The width of each ventilation slot 34 may increase as ventilation slot 34 extends radially from the center of dynamoelectric machine 2 (FIG. 1). As described in further detail herein, a user can perform methods according to the present disclosure within any one of several ventilation slots 34 within stator core 10.

Figure 4:
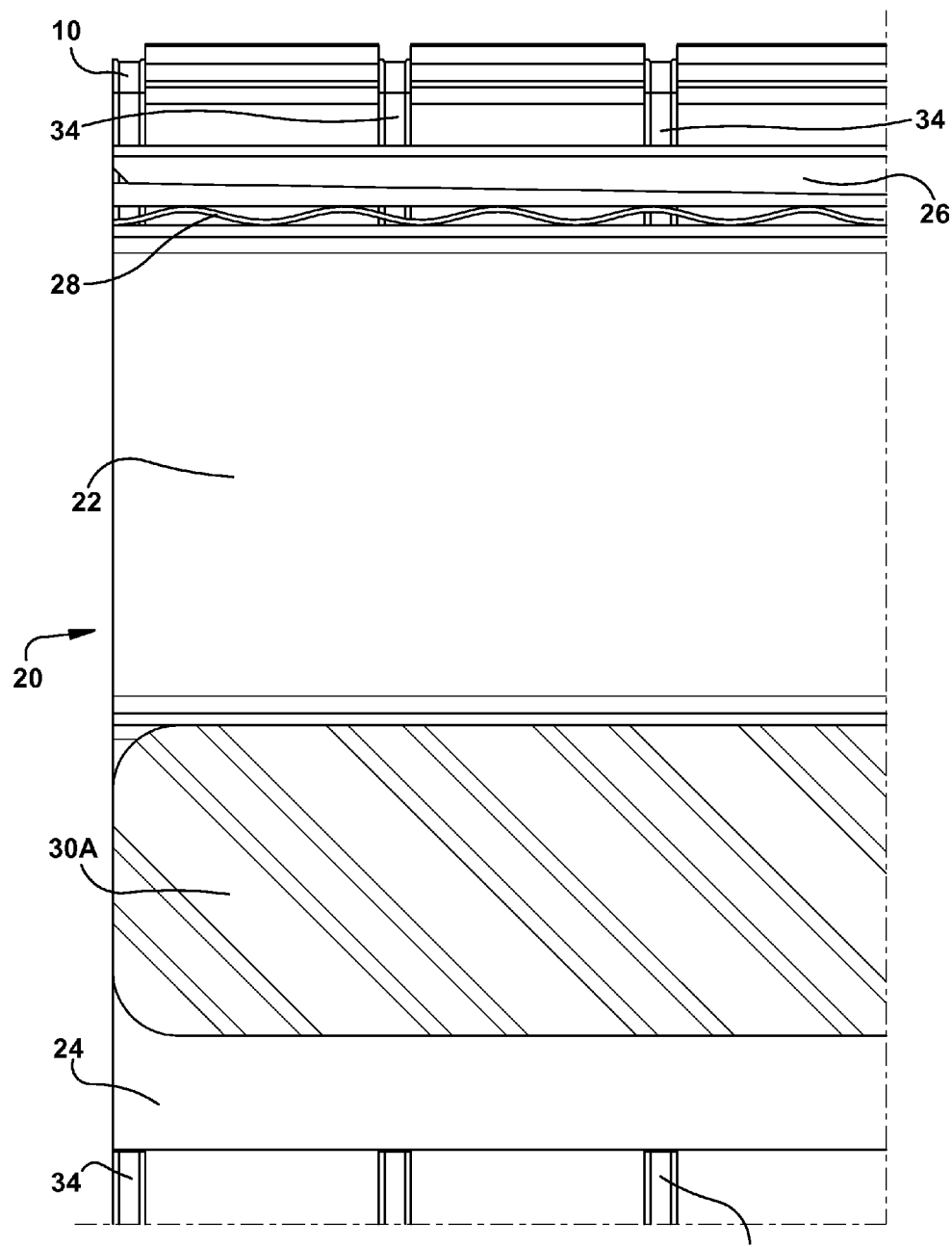
FIG. 4 is a longitudinal cross sectional view of a conventional stator bar within a conventional stator core.

FIG. 4 shows a longitudinal cross section of stator armature 20 within stator core 10. As discussed elsewhere herein, stator armature 20 can include a first stator bar 22 and a second stator bar 24. In addition, stator armature 20 may be in contact with side ripple spring 30A, and top ripple spring 28 (coupled to wedge 26). As shown in FIG. 4, the surface of one stator armature 20 can be perpendicular to several ventilation slots 34. Similarly, side ripple spring 30A can intersect multiple ventilation slots 34 despite being in contact with one stator armature 20.

Figure 5:
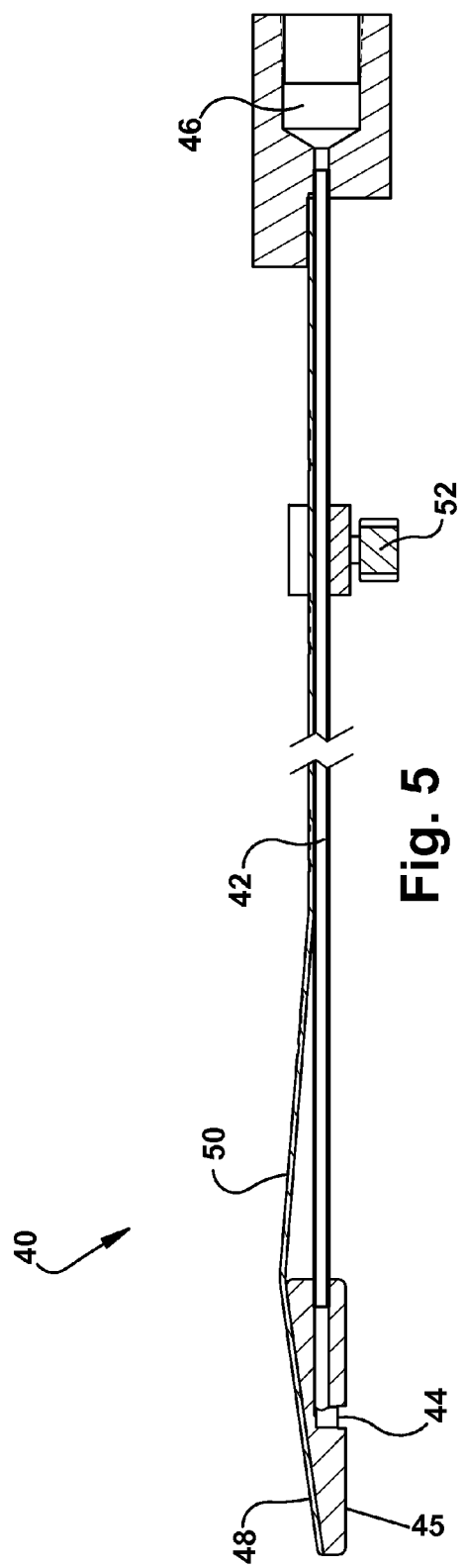
FIG. 5 is a cross sectional view of a tool for applying a liquid based vibration-absorbing material in a method according to an embodiment of the invention.

Turning to FIG. 5, an example of a tool 40 for injecting a liquid based vibration-absorbing material in a method according to embodiments of the present disclosure is shown. Devices similar to tool 40 have previously been implemented to deliver materials used for electrical insulation (e.g., U.S. Pat. No. 4,112,041). A liquid based vibration-absorbing material can include any currently known or later discovered materials capable of absorbing stator vibrations within stator core 10 (FIGS. 1-4). For instance, the liquid based vibration-absorbing material can have high viscosity when applied. Upon application, the liquid based vibration-absorbing material can cure into a solid state. The liquid based vibration-absorbing material, after curing, can remain in contact with side ripple springs 30A, 30B (FIGS. 2, 3), in addition to stator core 10 (FIGS. 1-4), stator armature 20 (FIGS. 2-4), and/or armor 29 (FIGS. 2, 3), if desired. In some embodiments, the liquid based vibration-absorbing material can include a conductive or non-conductive room-temperature vulcanizing material. Specifically, the liquid based vibration-absorbing material can include a non-conductive or conductive room-temperature vulcanizing silicone (CRTV). In other embodiments, the liquid based vibration-absorbing material can include epoxy, polyester, and/or urethane foam.

Tool 40 may include an injection line 42 terminating at an injection port 44 at an end of tool 40. Injection line 42, shown in the form of a tube, can deliver a liquid based vibration-absorbing material from coupler 46. Injection line 42 can be composed of a flexible material, such as a plastic, to allow tool 40 to be used more efficiently. Coupler 46 can be coupled to a reserve (not shown) and/or other hoses, supplies, components, etc. for delivering a liquid based vibration-absorbing material. Although tool 40 is shown by example to have an injection port 44 perpendicular to a surface 45 of tool 40, injection port 44 can have any desired angle. For example, injection port 44 can be oriented approximately forty-five degrees relative to the surface of stator armature 20 (FIGS. 2-4). Modifying the orientation of injection port 44 can enhance the application of liquid based vibration-absorbing material injected from tool 40 by causing injected material to cover a greater surface area.

In an embodiment, tool 40 can include an injection needle 48. Injection needle 48 can optionally have a sloped face designed to complement ventilation slot 34 (FIG. 3), thereby allowing tool 40 to enter and remain within ventilation slot 34. Further, tool 40 can include a back spine 50 configured to contact stator components at or near the location of injection port 44. For example, back spine 50 can be a hardened, stainless steel component which structurally supports tool 40 at a point where a user desires to apply a liquid based vibration-absorbing material. Further, tool 40 can include adjustable depth stop 52, which can be placed upon a surface of stator core 10 (FIGS. 1-4) or other area during use of tool 40. The position of adjustable depth stop 52 on tool 40 can be adjusted for installation of liquid based vibration-absorbing materials in ventilation slots of varying size. For example, a user may align injection port 44 of tool 40 with stator armature 20 or stator core 10, and place depth stop 52 upon a component (e.g., a block or lamination) of stator core 10 (FIGS. 1-4) to keep tool 40 in place while material is being applied therefrom.

In other embodiments, tool 40 for applying a liquid based vibration-absorbing material can include a hypodermic needle, a borescope with a liquid delivery channel, or any alternative embodiment described herein. Other currently known or later developed tools and/or devices for applying a liquid based vibration-absorbing material can also be applied in methods according to the present disclosure.

Figure 6:
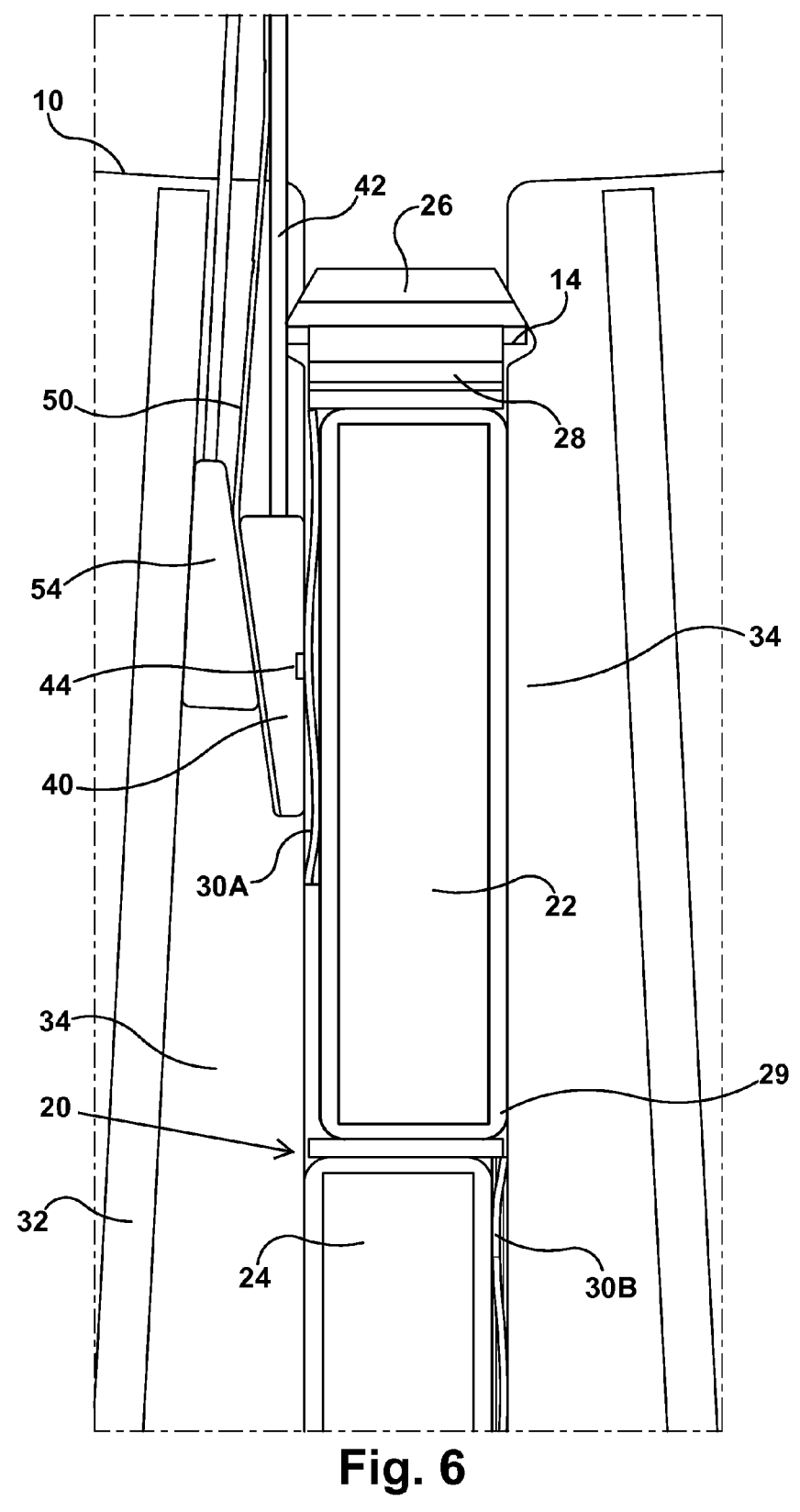

Turning to FIG. 6, an embodiment of a method for reducing vibration damage in a stator is shown. One or more side ripple springs 30A, 30B can lose mass or volume upon sustaining damage from stator vibrations. For example, some particles of the material making up side ripple springs 30A, 30B can separate from the structure of side ripple springs 30A, 30B during the operation of dynamoelectric machine 2 (FIG. 1) as a result of stator core 10 being weakened from continued use. Side ripple springs 30A, 30B may have less capacity to absorb stator vibrations if the loss of materials becomes significant. The present disclosure allows a user to repair and protect side ripple springs 30A, 30B.

In an embodiment, a user can apply a liquid based vibration-absorbing material onto a stator component to absorb stator vibrations. The applied liquid based vibration-absorbing material may be applied from ventilation slot 34 of stator core 10. In some embodiments, a user can apply the liquid based vibration-absorbing material with tool 40 by injecting the liquid-based vibration-absorbing material from injection port 44. If desired, back spine 50 of tool 40 can be held securely at a point of application by being aligned with a spacer 54. During application, a user can press tool 40 against stator armature 20 and/or stator core 10. Contact between tool 40 and stator armature 20 or stator core 10 can stop any liquid based vibration-absorbing material from leaving stator slot 12 (FIG. 2) and entering ventilation slot 34. A corresponding spacer 54 can be in contact with or coupled to back spine 50 to provide additional support. For example, a user can insert spacer 54 into ventilation slot 34 following insertion of tool 40. Spacer 54 can be substantially aligned with a desired point of application. Tool 40 can then be positioned alongside spacer 54 to occupy the remainder of ventilation slot 34. As a result, tool 40 and spacer 54 can occupy substantially all of ventilation slot 34 between spacer block 32 and stator armature 20.

Liquid based vibration-absorbing material, upon leaving tool 40, can contact side ripple springs 30A, 30B. The applied liquid based vibration-absorbing material can also contact stator core 10, stator armature 20, and/or armor 29 upon application. In alternative embodiments, the liquid based vibration-absorbing material may be applied from between side ripple spring 30A, 30B and stator core 10.

Embodiments of the disclosed method can include inserting tool 40 into ventilation slot 34 to orient injection port 44 towards stator armature 20 and/or side ripple springs 30A, 30B. Orienting injection port 44 in this manner can stop the liquid based vibration-absorbing material from entering ventilation slot 34. This approach can also cause any applied liquid based vibration-absorbing material to enter stator core slot 12 (FIG. 2) directly from injection port 44. Thus, liquid based vibration-absorbing material can be prevented from entering ventilation slot 34 following its application.

Vibration-absorbing materials used in embodiments of the present disclosure can at least partially be in liquid phase when applied, and then cure at a desired location. Thus, a user can apply a liquid based vibration-absorbing material onto a stator component (e.g., side ripple springs 30A, 30B) where the liquid based vibration-absorbing material can cure. Upon curing, the liquid based vibration-absorbing material can become solid and/or substantially immobile. In this manner, the liquid based vibration-absorbing material can remain in contact with side ripple springs 30A, 30B and other components such as stator core 10, stator armature 20, and/or armor 29.

A user may choose liquid based vibration-absorbing materials with other advantageous properties. For instance, the liquid based vibration-absorbing material can also be electrically insulative, to prevent electrical shorts to ground from stator core 10, stator armature 20, and/or armor 29. In some embodiments, the applied liquid based vibration-absorbing material can also act as a charge dissipater to prevent corona from appearing throughout stator core 10 during operation. Corona are points of damage from electrical charges that may arc off of stator armature 20 and/or armor 29 into stator core 10 through side ripple springs 30A, 30B. Embodiments of the present disclosure can thus repair damage and deterioration in side ripple springs 30A, 30B, stator armature 20, and/or armor 29 resulting from electrical corona in addition to damage from stator vibrations.

Figure 7:
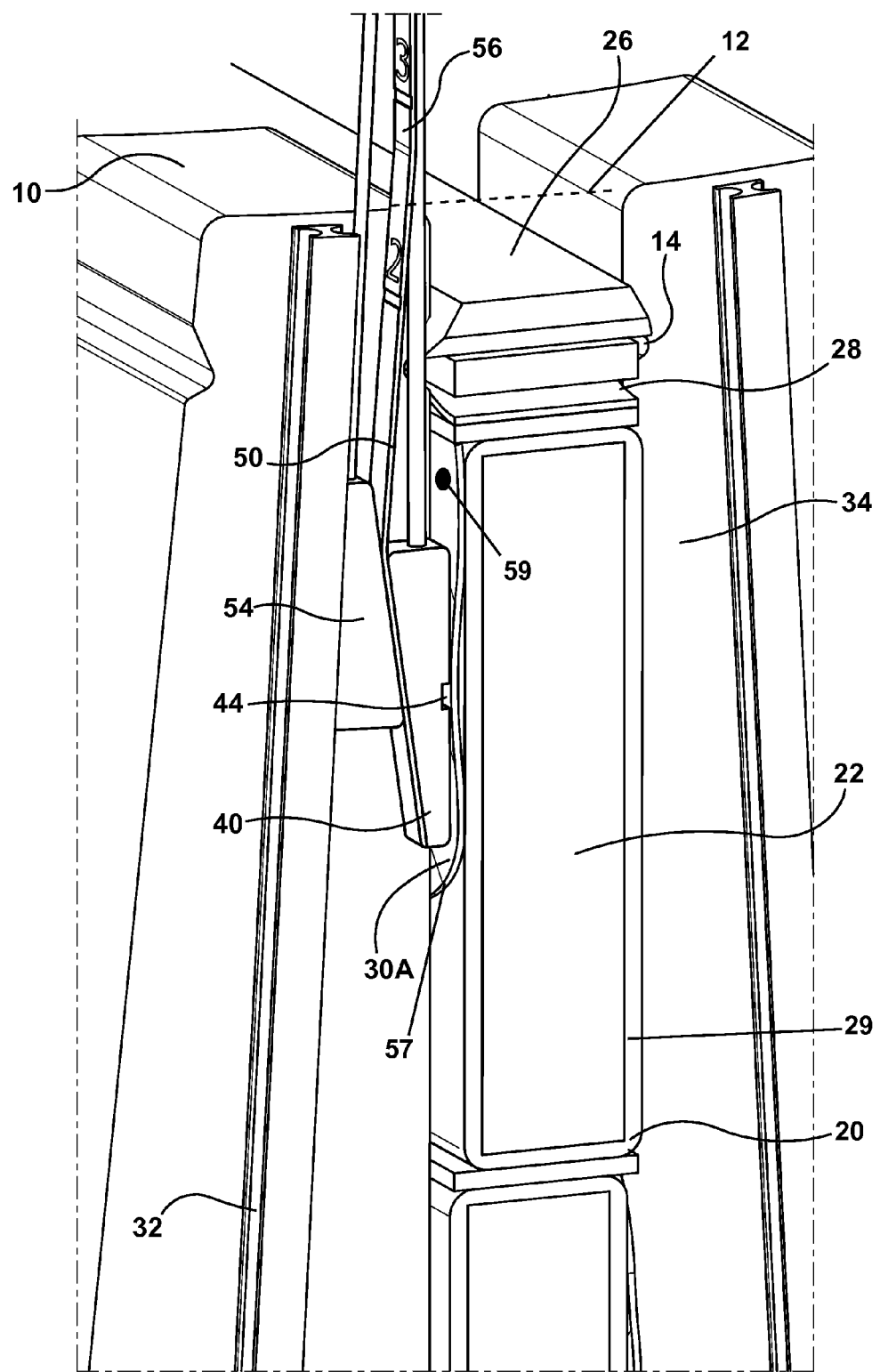
FIG. 7 is a perspective partial view of a configuration for applying a liquid based vibration-absorbing material onto a side ripple spring according to an embodiment of the invention.

Turning to FIG. 7, additional features compatible with the method are shown. As shown by example in FIG. 7, back spine 50 of tool 40 can include a depth guide 56 to indicate the depth to which a user has inserted tool 40. In an embodiment, applying a liquid based vibration-absorbing material to side ripple spring 30A can cause the material to enter stator bar slot 12 to contact side ripple spring 30A and stator core 10. Additionally or alternatively, the liquid based vibration-absorbing material can substantially fill a vacant space of stator bar slot 12 between side ripple spring 30A and stator core 10.

In another embodiment, the applied liquid based vibration-absorbing material can enter and repair the material composition of side ripple spring 30A. For example, each side ripple spring 30A can have a "trough" section 57. Trough section 57 can refer to a portion of side ripple spring 30A underneath a surface where side ripple spring 30A is in contact with stator core 10 or stator armature 20. In embodiments of the method, liquid based vibration-absorbing material from tool 40 can enter trough section 57 of side ripple spring 30A to substitute, replenish, and/or impregnate any materials damaged from stator vibrations. In addition, the liquid based vibration-absorbing material can remain in place to increase the lateral stiffness of stator armature 20 and/or armor 29 to improve or replenish resistance to stator vibrations.

Side ripple spring 30A can include fiberglass and/or other flexible materials. As dynamoelectric machine 2 (FIG. 1) operates, stator vibrations can damage fiberglass in side ripple spring 30A. Methods according to the present disclosure can repair damage to side ripple spring 30A through applying a liquid based vibration-absorbing material that includes a silicone resin configured to impregnate the fiberglass. For example, a silicone resin in a liquid based vibration-absorbing material can enter trough 57 to impregnate the fiberglass. The impregnation of liquid based vibration-absorbing material can repair side ripple springs 30A and/or increase the resistance of side ripple springs 30A to stator vibrations. The cured vibration-absorbing material can thereafter remain in contact with side ripple spring 30A. As a result, the cured vibration absorbing material becomes a component of dynamoelectric machine 2 (FIG. 1) and protects the components thereof from the various forms of damage described herein.

Embodiments of the present disclosure can include also include contacting stator core 10, stator armature 20 (including armor 29 provided thereon), and side ripple spring 30A with the applied liquid based vibration-absorbing material. The applied material, by contacting several components within dynamoelectric machine 2 (FIG. 1), can supplement or repair portions of several stator components previously damaged by stator vibrations. In addition, the liquid based vibration-absorbing material, once cured, can fill a gap between side ripple spring 30A and stator core 10.

One or more vibration-induced cavities 59 may form upon stator armature 20, armor 29, and/or side ripple springs 30A as a type of vibration damage sustained by stator core 10. In some embodiments, the applied liquid based vibration-absorbing materials can enter and fill vibration-induced cavities 59 of side ripple springs 30A. In other embodiments, material used to repair side ripple spring 30A can also fill and repair vibration-induced cavities 59 present on stator core 10, stator armature 20, and/or armor 29. Applying a liquid based vibration absorbing material to vibration-induced cavity 59 can eliminate this form of damage in addition to repairing side ripple spring 30A.

Figure 8:
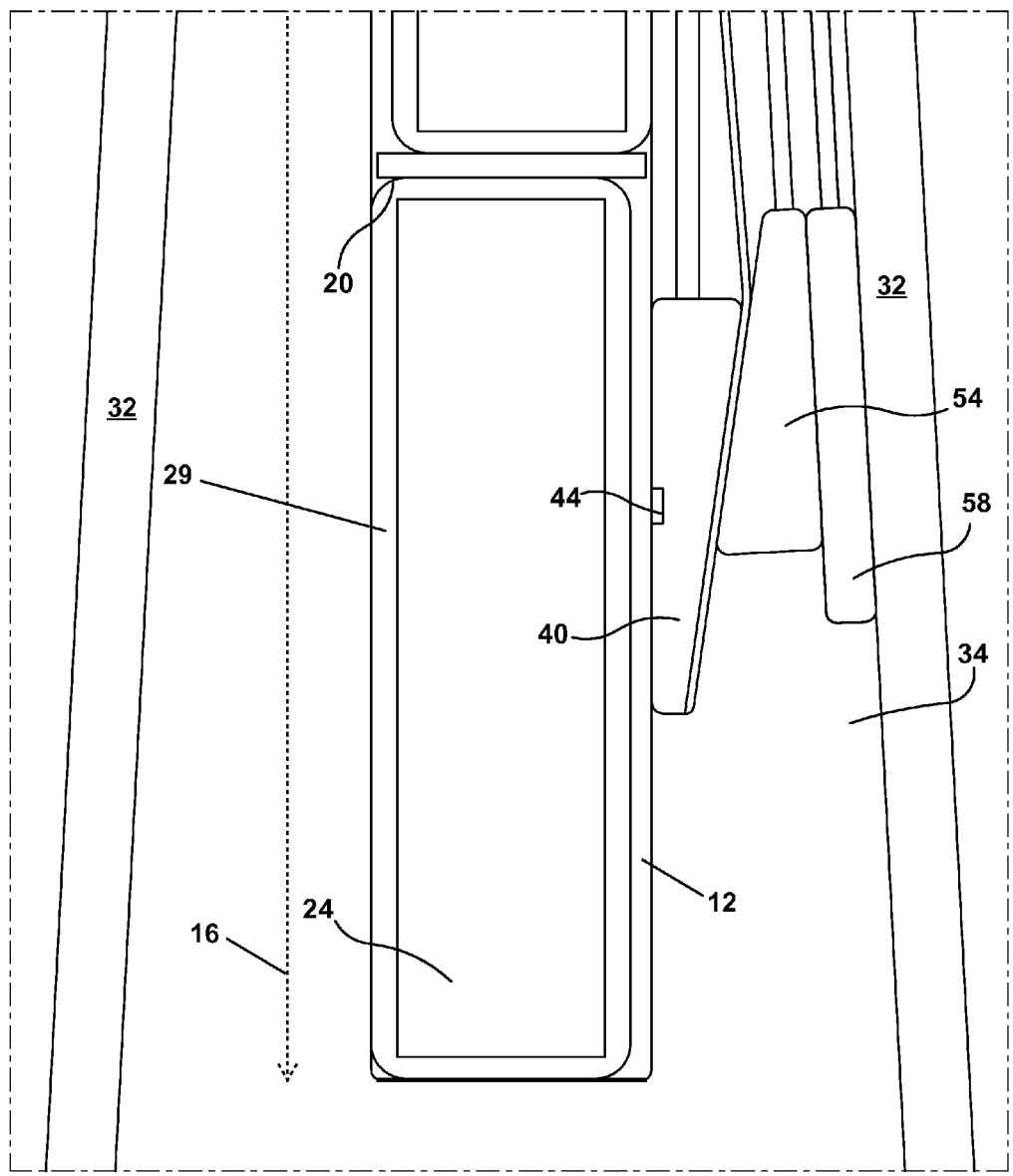
FIG. 8 is a perspective partial view of a configuration for applying a liquid based vibration-absorbing material in an end-iron region according to an embodiment of the invention.

Turning to FIG. 8, a further embodiment of a method for reducing vibration damage in a stator is shown. The method can include applying a liquid based vibration-absorbing material within an end-iron region 16 (designated by accompanying phantom line). As described elsewhere herein, end-iron region 16 can include a section where the radially inner surface of stator core 10 steps radially, and any corresponding dovetails 14 (FIG. 1) may vanish. A user can position tool 40 within end-iron region 16 and apply a liquid based vibration-absorbing material from within ventilation slot 34. As shown in FIG. 8, end-iron region 16 may not include side ripple springs therein. However, liquid based vibration-absorbing material from tool 40 can cure within both end-iron region 16 and any side ripple springs FIGS. 2-4, 6, 7) located elsewhere by traveling through stator bar slot 12 before curing.

In some regions of stator core 10, such as end iron region 16, the width of ventilation slot 34 may be too large for tool 40 to be secured on only one spacer 54. To avoid this problem, one or more additional spacers 58 can also be used to further stabilize tool 40. As a result, spacer 54 and additional spacers 58 can allow tool 40 to be deployed in a variety of situations.

Figure 9:
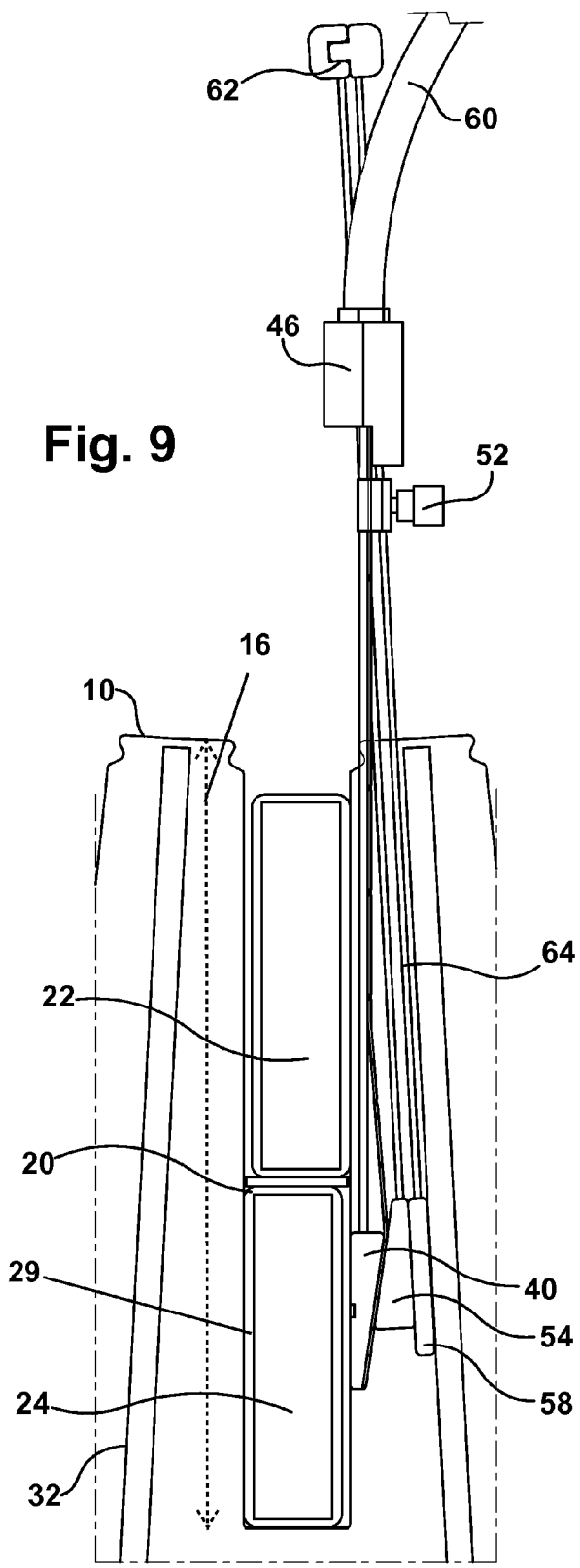
FIG. 9 is a cross sectional view of a liquid based vibration-absorbing material being applied in an end-iron region according to an embodiment of the invention.

Turning to FIG. 9, an additional configuration for applying a liquid based vibration-absorbing material within end-iron region 16 is shown. Tool 40 can be coupled to hose 60 at coupler 46. Hose 60 can deliver (e.g., by pumping) a liquid based vibration-absorbing material from a bulk supply (not shown), allowing large quantities of a liquid based vibration-absorbing material to be applied within stator core 10. In addition, a spacer handle 62 can move spacer 54 and/or additional spacer 58 to a desired location. Spacer handle 62 can be connected to spacer 54 and/or additional spacer 58 through a spacer coupling 64. Spacer coupling 64 can include any device for coupling which is capable of moving spacer 54 and/or additional spacer 58 to various positions. In some embodiments, spacer coupling 64 can be a mechanically actuated device. For example, spacer coupling 64 can include a rod, a tube, a line, a shaft, or any other mechanical components currently known or later developed.

In end-iron region 16, stator armature 20 may lack a wedge 26 (FIG. 2) and top ripple spring 28 (FIG. 2), thereby having reduced capacity to absorb radial stator vibrations. To repair any damage related to the lack of wedge 26 (FIG. 2) and top ripple spring 28 (FIG. 2), a vibration-absorbing material may be applied to stator armature 20 and/or stator core 10 within end-iron region 16. In other embodiments, portions of end-iron region 16 may include side ripple springs 30A, 30B (FIGS. 2-4, 6, 7), and liquid based vibration-absorbing material may contact and cure upon side ripple springs 30A, 30B (FIGS. 2-4, 6, 7) according to other embodiments of the disclosure described elsewhere herein.

While shown and described herein as a method for reducing damage in a stator, it is understood that aspects of the invention further provide various alternative embodiments. For example, in one embodiment, the invention provides a dynamoelectric machine resulting from a method according to the present disclosure.

Figure 10:
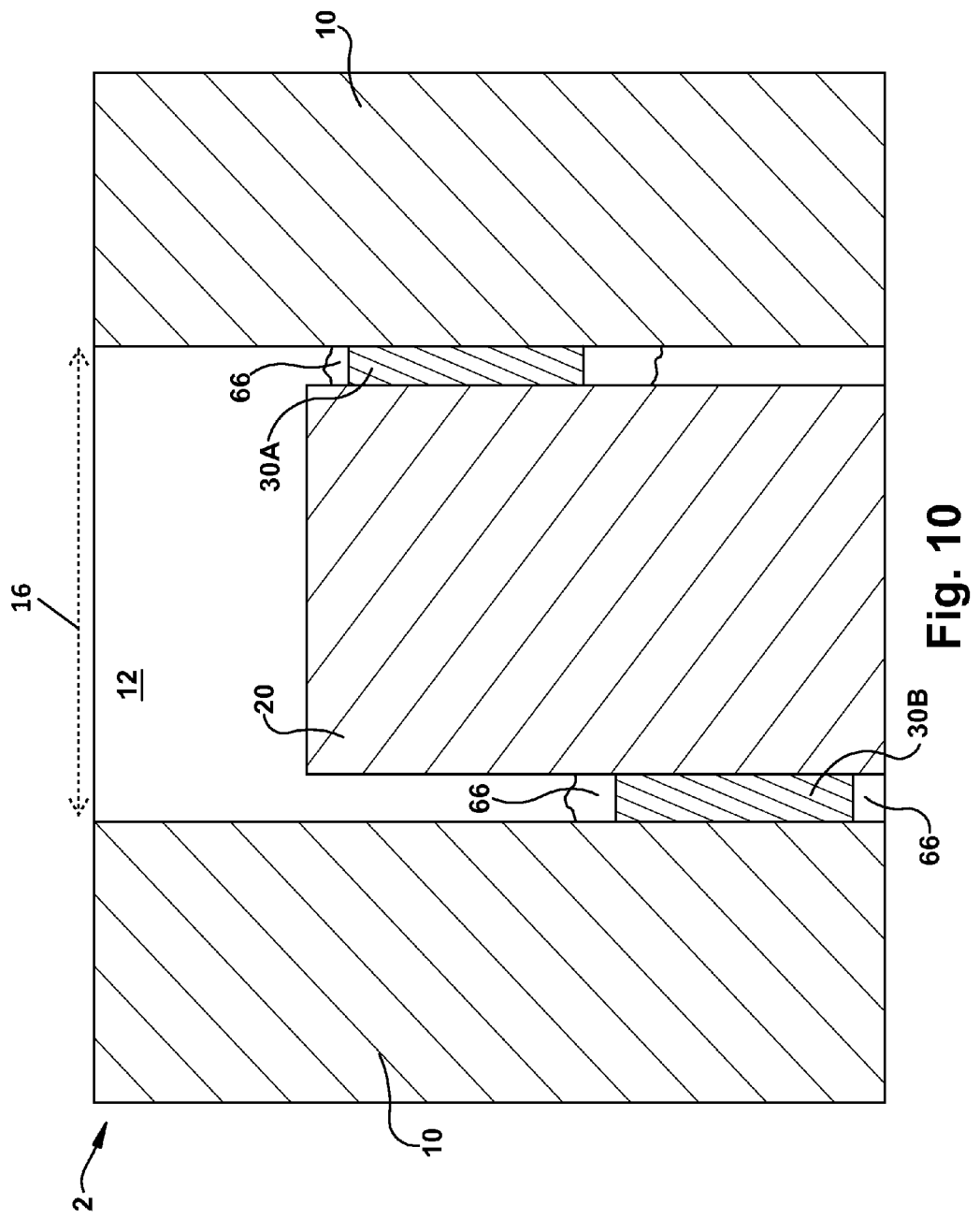
FIG. 10 is a partial cross sectional diagram of a stator bar and stator core according to an embodiment of the invention.

With reference to FIG. 10, embodiments of the present disclosure can include dynamoelectric machine 2 having stator bar slot 12. Stator armature 20 can be installed within stator bar slot 12 within end-iron region 16. In an embodiment, side ripple springs 30A, 30B can also be present within end-iron region 16 between stator armature 20 and/or stator core 10. Further, stator bar slot 12 can include a liquid based vibration-absorbing material 66 injected within stator bar slot 12 to absorb stator vibrations. Liquid based vibration-absorbing material 66 can include vibration-absorbing materials discussed elsewhere herein, such as non-conductive room temperature vulcanizing silicone, and therefore absorb stator vibrations acting on stator core 10. Liquid based vibration-absorbing material 66 can be injected following the assembly of dynamoelectric machine 2. More specifically, liquid based vibration-absorbing material 66 can be injected following the installation of stator armature 20.

As shown in FIG. 10, liquid based vibration-absorbing material 66 can be present in at least a portion of end-iron region 16. In addition or alternatively, liquid based vibration-absorbing material 66 can be in contact with stator core 10 and/or stator armature 20 (including armor 29 (FIGS. 2, 3, 6-9) provided thereon). Generally, embodiments of the present disclosure also extend to dynamoelectric machines and stator cores that have been repaired or equipped according to the methods described herein. In embodiments of the present disclosure where side ripple springs 30A, 30B are composed of a fiberglass material, vibration-absorbing material 66 may include a silicone resin. Silicone resin from vibration-absorbing material 66 may enter side ripple springs 30A, 30B to impregnate the fiberglass with the silicone resin, thereby repairing vibration-caused damage to side ripple springs 30A, 30B.

The embodiments of methods and apparatuses discussed in this disclosure can offer several technical and commercial advantages, some of which are discussed herein by way of example. An advantage that can be realized from the disclosed method and resulting dynamoelectric machines is an ability to repair stator bars within a stator core of a dynamoelectric machine without rewinding or replacing the existing stator bars. Further, the present disclosure contemplates a method for repairing damage to side ripple springs without a need to remove or replace the side ripple springs.

In addition, some liquid based vibration-absorbing materials discussed herein can reduce and/or prevent corona damage that may otherwise occur during the operation of a dynamoelectric machine. For example, methods and machines according to the present disclosure can increase lateral stiffness in an end-iron region of a stator core, which further repairs damage from or increases resistance to stator vibrations. In some embodiments, the present disclosure contemplates applying a liquid based vibration-absorbing material at an angle of approximately forty-five degrees relative to the surface of a stator armature or stator core to improve coverage of the applied liquid based vibration-absorbing material, which can decrease the risk of abrasion.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A dynamoelectric machine comprising:
a stator core having a stator bar slot, wherein the stator bar slot includes an end-iron region, wherein the end-iron region of the stator bar slot is free of stator bar dovetails and side ripple springs therein;
a stator bar installed within the stator bar slot, wherein at least a portion of the stator bar slot is within the end-iron region;
a cured vibration-absorbing material, including a non-conductive room-temperature vulcanizing silicone, located within the end-iron region and in contact with each of the stator core and the stator bar; and
a side ripple spring in contact with one of the stator bar or the stator core, wherein the side ripple spring is positioned between the stator bar and the stator core wholly outside the end-iron region, such that the cured vibration-absorbing material further includes a portion within the end-iron region positioned directly between the stator bar and the stator core.

2. The dynamoelectric machine of claim 1, wherein the cured vibration-absorbing material also includes a silicone resin, and the side ripple spring includes a fiberglass material impregnated with the silicone resin.

3. The dynamoelectric machine of claim 1, wherein side ripple spring at least partially includes the cured vibration-absorbing material therein, such that the cured vibration-absorbing material is positioned within the side-ripple spring and the end-iron region of the stator bar slot.

4. A method for reducing vibration damage in a stator, the method comprising:
applying, from within a ventilation slot of a stator core, a liquid based vibration-absorbing material onto:
a side ripple spring such that the liquid based vibration-absorbing material contacts and enters a trough of the side ripple spring to repair damage to the side ripple spring, the side ripple spring being in contact with a stator bar and the stator core, and
an end-iron region of the ventilation slot, the end-iron region being free of stator bar dovetails and side ripple springs therein; and
allowing the liquid based vibration-absorbing material to cure, wherein a first portion of the cured vibration-absorbing material remains in contact with the side ripple spring to absorb stator vibrations, and wherein a second portion of the cured vibration-absorbing material remains within the end-iron region directly between the stator bar and the stator core.

5. The method of claim 4, wherein the cured vibration-absorbing material contacts each of the side ripple spring and the stator core.

6. The method of claim 4, wherein the liquid based vibration-absorbing material includes a conductive room-temperature vulcanizing silicone.

7. The method of claim 4, wherein the liquid based vibration-absorbing material includes a non-conductive room-temperature vulcanizing silicone.

8. The method of claim 4, further comprising preventing the liquid based vibration-absorbing material from entering a stator ventilation slot.

9. The method of claim 4, wherein the applying includes applying the liquid based vibration-absorbing material onto a vibration-induced cavity of the side ripple spring.

10. The method of claim 4, wherein the cured vibration-absorbing material increases a lateral stiffness of the stator bar.

11. The method for reducing vibration damage in a stator of claim 4, wherein the applying, from within the ventilation slot of the stator core, occurs between the side ripple spring and the stator core.

12. The method of claim 4, wherein the liquid based vibration-absorbing material comprises one of epoxy, polyester, and urethane foam.

13. The method of claim 4, wherein the cured vibration-absorbing material contacts each of the side ripple spring and an armor of the stator core.

14. The method of claim 4, wherein the applying of the liquid based vibration-absorbing material includes injecting the liquid based vibration-absorbing material at a non-perpendicular angle relative to a sidewall of the stator bar.

15. The method of claim 14, wherein the non-perpendicular angle is approximately forty-five degrees relative to the sidewall of the stator bar.

16. A method for repairing a side ripple spring comprising a fiberglass material and reducing vibration damage in a ventilation slot of a stator core, the method comprising:

applying a liquid based vibration-absorbing material, including a silicone resin, onto each of:

the side ripple spring such that the liquid based vibration-absorbing material contacts and enters a trough of the side ripple spring to repair damage to the side ripple spring, and to impregnate the fiberglass material of the side ripple spring with the silicone resin of the liquid based vibration-absorbing material, wherein the applying occurs within the ventilation slot of the stator core, and an end-iron region of the ventilation slot, the end-iron region being free of stator bar dovetails and side ripple springs therein, such that the side ripple spring is located wholly outside the end-iron region; and allowing the liquid based vibration-absorbing material to cure, wherein a first portion of the cured vibration-absorbing material remains in contact with the side ripple spring for absorbing stator core vibrations, and wherein a second portion of the cured vibration-absorbing material remains within the end-iron region directly between the stator bar and the stator core.

17. The method of claim 16, further comprising allowing the cured vibration-absorbing material to fill a gap between the side ripple spring and a stator core.

18. The method of claim 16, wherein the liquid based vibration-absorbing material comprises one of a conductive room-temperature vulcanizing silicone and a non-conductive room-temperature vulcanizing silicone.

\* \* \* \* \*